United States Patent Office

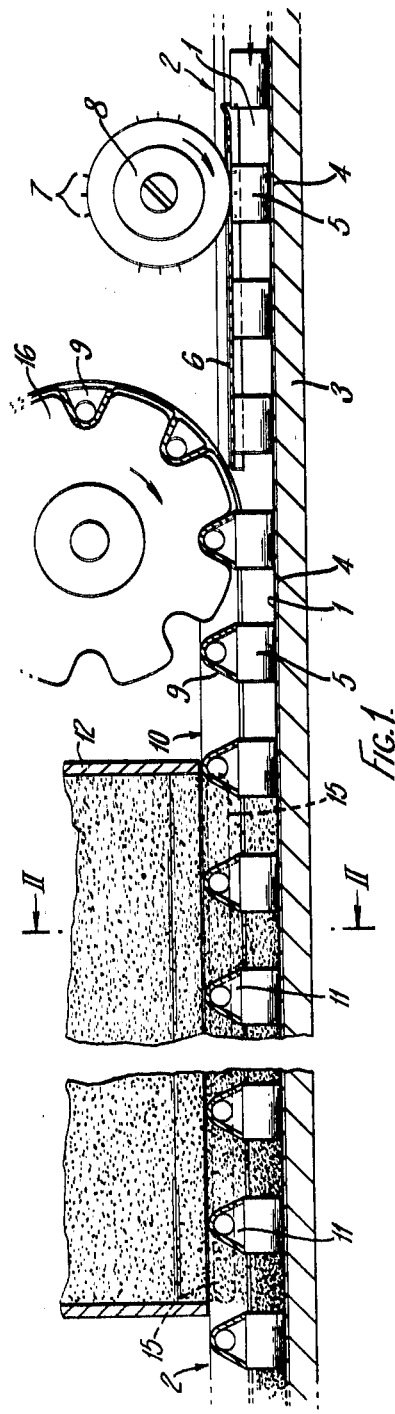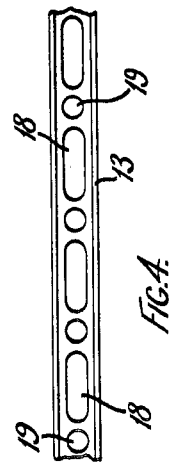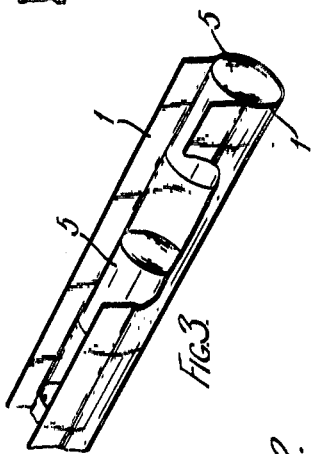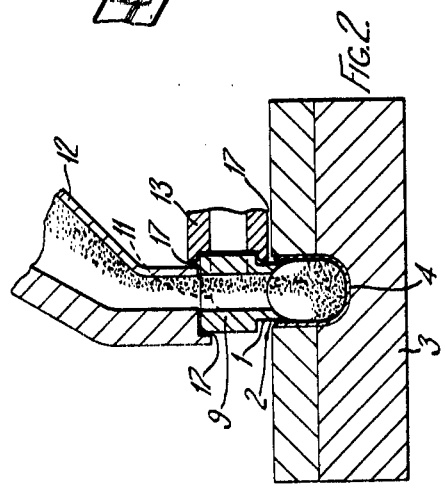

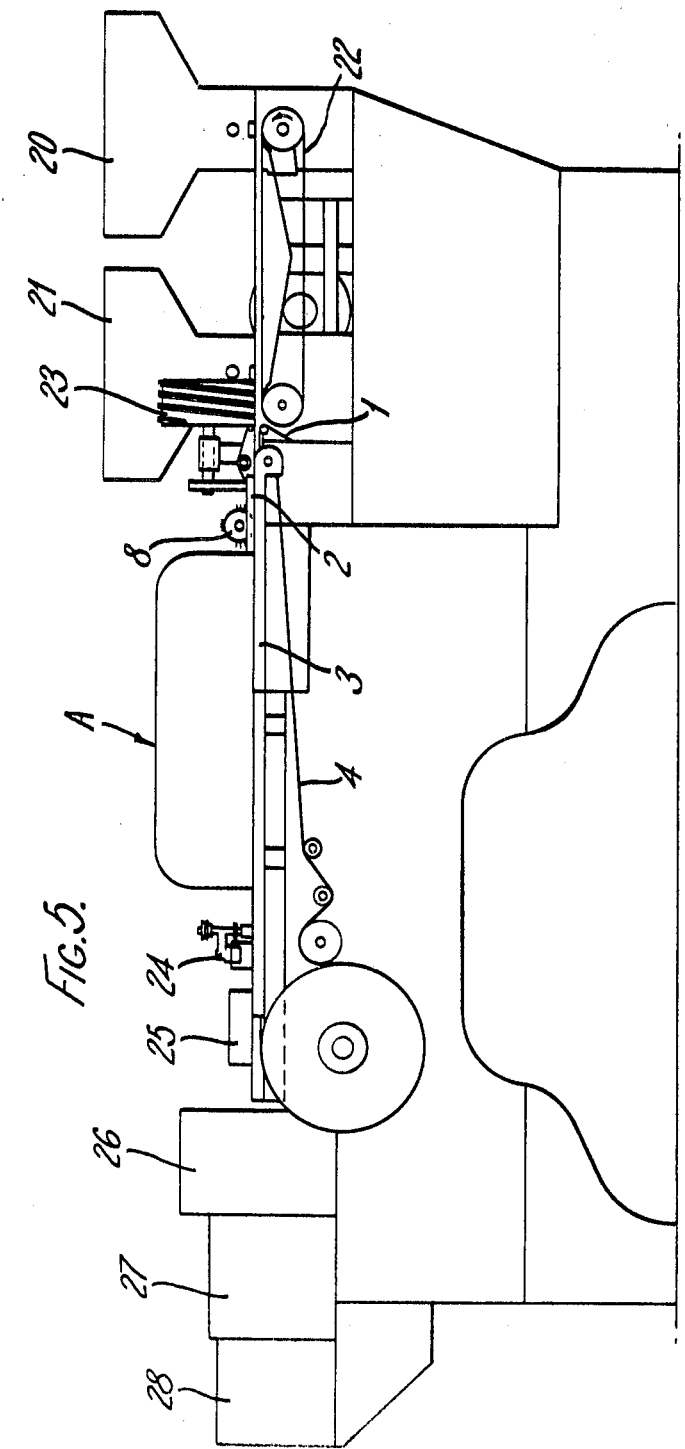

3,610,112
Patented Oct. 5, 1971

3,610,112
MANUFACTURE OF FILTERS FOR CIGARETTES AND LIKE SMOKERS' ARTICLES
Francis Auguste Maurice Labbe, Neuilly-sur-Seine, France, assignor to Molins Machine Company Limited, London, England
Filed June 26, 1969, Ser. No. 836,922
Claims priority, application Great Britain, June 28, 1968, 31,163/68
Int. Cl. A24c 5/50
U.S. Cl. 93—1 C
18 Claims

ABSTRACT OF THE DISCLOSURE

In a method of making a continuous filter rod for cigarettes which involves depositing loose filter material into spaces between a continuous stream of spaced apart plugs, suction is applied to draw the loose filter material into the spaces.

---

This invention relates to the manufacture of filters for cigarettes and like smokers' articles.

Filters are known which comprise plugs or stubs of a conventional kind enclosed in a wrapper and spaced apart, with powdered, granular or other particulate filtering material (hereinafter called "loose material") occupying the spaces between them. These may be made by arranging the stubs, suitably spaced, on a wrapper web or strip which is curved transversely to trough shape, and feeding the loose material into the open troughs between the stubs. Difficulty may be experienced in satisfactorily feeding a sufficient quantity of loose material into each space, and it is very desirable that an accurately known quantity should be contained in each space or pocket between the stubs, since if on the one hand too little is present, there is a risk that smoke being drawn through the filter may by-pass the loose material and fail to be filtered or if, on the other hand, too much material is inserted then it may be packed rather tightly and cause difficulties in drawing smoke through the cigarette. Moreover if loose material is fed into the troughs between stubs to a height which is greater than the line of contact between the wrapper and the stub there is a real risk that some of it will become entrapped between the stub and wrapper thereby producing a flow passage for the smoke to by-pass the filter. In addition such an event can be undesirable from the point of view of appearance and feel.

It is an object of the present invention to provide an improved method and apparatus for the manufacture of filters and cigarettes which is particularly suitable for producing filters containing loose material.

According to one aspect of the present invention there is provided a method of manufacturing filters which includes feeding loose material into spaces between stubs spaced apart within a trough-shaped wrapper, and includes the step of drawing air through the exposed sides of the stubs in order to apply suction through the ends of the stubs, thereby to assist the movement of loose material into the spaces between the stubs.

The invention also provides apparatus for performing the said method, comprising means to feed loose material towards spaces between endwise-spaced plugs in a trough-shaped wrapper, and means to apply suction through the exposed sides of some at least of the stubs so as to apply suction through the ends of the stubs.

Where the stubs are of a type having a wrapper of low porosity such that it is difficult for air to traverse it, then they may be provided with holes in their outer wrappers to facilitate the operation. These holes may, if desired, be formed before the stubs are brought to the machine in which they are combined with loose material. It may however be convenient to form the holes on the said machine, and for this purpose means can be provided to perforate the wrappers of stubs at suitable locations before the stubs are brought into register with the suction-applying means. In a continuous rod machine, in which the stubs move continuously endwise, a spiked wheel may be arranged to rotate over the moving stubs to perforate them and may have groups of spikes arranged at regular intervals around its periphery for each group to spike one stub. It may help in perforating the stub wrappers to compress the stubs so as to make them somewhat firmer and make the perforations cleaner. This can be done by means of a tongue disposed beneath the spiked wheel and slotted to accommodate the spikes.

The suction-applying means can include a suction element arranged to move above and in contact with the stubs, and having ducts to communicate on the one hand with the stub peripheries and on the other hand with a suction chamber.

Conveniently the suction element takes the form of an endless member within which the said ducts are formed, and with apertures between the ducts through which the loose material can be fed down into the spaces between the stubs. Conveniently this endless member is movable past a stationary suction chamber with which each duct in turn can register. With such an arrangement, the loose material can be fed simultaneously to a number of consecutive apertures to provide a progressive filling of the spaces.

Thus the invention also provides an apparatus for feeding loose material into spaces between stubs, an endless screening member having spaced apertures to allow loose material to be fed through them into the said spaces between stubs, and suction ducts between said apertures, each said duct extending to one surface of the endless member to communicate with the exposed surface of a plug lying in the trough of the wrapper web beneath the member, and also extending to another surface of the member so as to be capable of registering and communicating with a suction source.

The flow of air into and through the stubs depends on the internal porosity or air-perviousness of the stubs. As these stubs are intended to filter tobacco smoke, they should not be too porous. In one aspect of the invention however, stubs are used that are initially of larger cross-section than required and of correspondingly greater porosity, and are subsequently (i.e. after the loose material has been fed into the spaces) compressed to desired size, with corresponding reduction of their porosity.

In another aspect the invention provides a method of manufacturing filters for cigarettes and the like which includes feeding loose material into spaces between stubs spaced apart within a trough-shaped wrapper and includes the step of drawing air through the stubs to act on the wrapper to adapt its cross-sectional shape to conform more closely with the stubs, the stubs having a high-porosity periphery.

A method or apparatus such as described above could if desired, according to another feature of this invention, be combined with a method or apparatus by which suction is applied to the wrapper which carries the stubs, as mentioned above.

Some embodiments of the invention will now be described by way of example with reference to the accompanying drawing, in which:

FIG. 1 is a sectional side elevational of cigarette-filter making apparatus,
FIG. 2 is a section on the line II—II of FIG. 1,
FIG. 3 is a perspective view of a filter rod in the process of being made,
FIG. 4 is a view of a modification, and FIG. 5 is a schematic view showing the whole machine incorporating the arrangements shown in the previous figures.

Referring firstly to FIGS. 1 and 2, a continuous paper wrapper web 1 is formed to U-section and is carried along a trough 2 in a bed 3 by a garniture tape 4. Contained within the trough-shaped web 1 there are filter plug stubs 5 which are suitably spaced apart endwise. The stubs may be composed of paper, cellulose acetate or any suitable material, and are larger in cross-section, and correspondingly more porous, than they are required to be in their final form. As can be seen from FIG. 2, the shape of the trough 2 is such that the stubs are also somewhat deformed from their original cylindrical shape.

The point of this, as is disclosed in continuation-in-part Ser. No. 797,435 is to increase the height at which the paper web 1 ceases to be in close contact with the stubs 5 so as thereby to increase the level to which a pocket between a pair of stubs can be filled with material without undue risk of its becoming trapped between the paper wrapper and a stub. In addition the stubs 5 shown in this embodiment are ones that have a paper wrapper which is not very previous to air; they are also located in position on the wrapper web 1 by means of adhesive.

A shoe 6 is fixed above trough 2 and presses on the upper surfaces of the stubs 5 and compresses them slightly to make them firmer. The shoe is apertured to enable spikes 7 on the rim of a rotating wheel 8 to pass through the shoe and puncture the wrappers of stubs 5. This puncturing is assisted by the compression of the plugs. The spikes are arranged in spaced groups as shown to register with the stubs 5.

Beyond the shoe 6 there is mounted an apertured endless band 9 arranged to move with the stubs above and in close contact with them. The band 9 which constitutes both an endless screening member and an endless suction element, has spaced apertures 10 extending through it from top to bottom, considering the run of the band in contact with the stubs. These apertures register with the spaces between the stubs.

Between the apertures 10 there are suction ducts 11 each of which is shaped to extend between on the one hand a side of the band 9 where it is brought into communication with a suction port 15 in a stationary suction chamber 13 and on the other hand the bottom of the band 9 where it can be brought into communication with holes pierced in the wrappers of the stubs. The ducts 11 are brought into register with the stubs whilst they also communicate with the suction port 15 and close contact between the band 9 and the stubs 5 helps to provide a good seal and maximise the airflow through the plugs.

The band 9 is shaped to be moulded out of plastic in a single casting and it is carried on sprocket wheels such as 16 the teeth of which are shaped to engage snugly in the apertures 10.

Above the band 9 there is a chute 12 through which loose material is showered downwardly from a bulky supply. As shown, the chute 12 extends over a number of spaces simultaneously so that as the stubs progress from right to left in FIG. 1, the spaces between them are progressively filled with loose material.

The rate of feeding mtaerial down the chute 12 is carefully metered and the material is so far as possible evenly spread along the chute 12. These effects can be achieved by feeding it to the chute 12 with the assistance of vibrating trays. In general, the greater the number of spaces 10 over which the chute 12 extends, the better from the point of view of filling the spaces between the stubs 5. But against this must be set the physical and cost limitations imposed on the size of the apparatus and the problems which may arise in feeding the material evenly over an exceptionally extended chute width. One compromise is for the chute to extend over a distance corresponding with the spacing of about ten stubs 5.

The suction chamber 13 is arranged at one side of and in close contact with the band 9 as shown in FIG. 2, and extends along substantially the whole length of the chute 12. The suction ducts 11 come progressively into register with the suction chamber 13, which is shown for simplicity as an open-sided chamber connected to a pipe through which air is continuously drawn by a suction pump, not shown. The bottom of the chute 12 fits snugly with the top of the band 9 but slightly spaced therefrom, as shown, to provide air guards 17.

In operation, as the stubs 5 are carried beneath and past the chute 12, loose material is continuously showered into the space between them, and the movement of the loose material into the spaces is assisted by suction from the suction chamber 13 which sucks air along the flow path comprising the ducts 11, the holes in the wrappers of the stubs 5, the interstitial spaces in the stubs 5, the pockets between the stubs, the apertures 10 in the band 9 and the interior of the chute 12. This air flow helps to direct the loose material into the spaces between the stubs 5 and to hold it there. At the same time the pressure within the chute 12 is somewhat reduced and this causes some air to be drawn through the air guard spaces 17. The effect of this is to make it difficult for the loose material to work its way into the moving parts and cause excessive wear or jamming.

If the loose material contains exceptionally fine particles of a size such as to be capable of passing through the stubs 5, then these will be extracted by the action of the suction. This has the advantage of ameliorating the risk of the smoker drawing such particles through the stubs and into his mouth and lungs.

Various advantages arise from this technique of charging the pockets between the stubs. For example, the packing of the material in the pockets is improved. In addition it is possible that a satisfactory filter rod of this nature could be made without deforming the stubs, or using oversized stubs, by employing a high level of suction so that the material is tightly compacted for wrapping and subsequently allowed to take up the space within the wrapping. In general it would probably be advantageous to increase the chute length for increased speeds of the wrapper web 1 so that the density of the descending curtain of material remains roughly constant.

Material extracted by the suction can be recovered by filtering the suction stream and in this connection it may be advantageous to use a heated air stream to reduce tendencies, which the material may have, to cake the filters used. The air could be heated by recirculating it through a fan used to provide the suction.

After the spaces have been filled, the stubs and loose material are enclosed in the wrapper 1, being at the same time compressed and formed to their desired cross-sectional size and circular shape, and the filter rod so formed is then cut through the plugs, into whatever lengths are required.

Suction can if desired also be applied through perforations or porosities in the paper web 1, by any convenient suction device, not shown.

Instead of wrapped stubs 5, stubs may be used which have no wrapping but are quite porous around their whole periphery. In this case the spiked wheel 8 is not necessary as there is no wrapper to perforate. When such stubs are carried under the band 9 and subjected to suction, the effect is to draw the wrapper web 1 closely about the stubs to seal their peripheries up to the point where the suction band 9 is in contact with the stub. As can be seen from FIG. 3, which shows a filter rod being made in a trough 2 which does not deform the stubs, this means that the spaces between the stubs can be filled to a higher level than is possible without deforming them, if the risk of material being trapped between a stub and its wrapping is to be avoided. This feature could also be of advantage with the trough 2 shown in FIGS. 1 and 2.

FIG. 4 shows a modification of the porting for the suction chamber 13 in which the suction ports are arranged as a series of elongated apertures 18, and between these apertures there are arranged a series of blow-holes 19 connected to a source of compressed air. Thus as each duct 11 moves along the chamber 13 it transmits to its respective stub alternate long sucks and short puffs. The effect of this is to help agitate the material in position and to reduce the effect of caking on the end face of a plug which could be such as to block the suction. It is to be noted that the alternate arrangement, with appropriate spacing, provides that whilst air is being blown into one end of a space between the stubs, it is being sucked into the other end, so that there is little or no tendency for the air puff to blow the material out of the space. It is also to be noted that for this reason suction ports 18 are provided at both ends of the chamber. This puff-suck arrangement may also help to improve the packing of the material.

In any of the embodiments described the band 9 and the suction chamber 13 can, if desired be extended a substantial distance past the chute 12 to hold the material in position, or to make sure that material sticking on the band 9 in the spaces 10 is drawn into the spaces between the stubs 5, and it is preferable for the band 9 and the suction chamber 13 to be arranged so that suction is applied to the stubs 5 before they pass under the chute 12.

A machine incorporating the above described arrangement is shown schematically in FIG. 5. In particular, the arrangement shown in FIG. 1 is shown in block form at A in FIG. 5, with the exclusion of the spiked wheel 8 which is shown separately. This machine is designed to form a line of spaced apart plugs of two different varieties. A first type of plug is supplied from a hopper 20 and is fed onto a conveyor belt 22 onto which a second line of plugs is supplied from a second hopper 21. Between the hoppers 20, 21 and the conveyor belt 22 is means for accelerating the plugs to form gaps between them so that in the final row of plugs, plugs of one type alternate with plugs of the other type, a gap being formed between each adjacent plug. A worm device 23 is placed downstream of the two hoppers 20, 21 to impart the correct spacing between adjacent plugs.

The line of spaced apart plugs then enters the bed 3 to be carried by the garniture tape 4 past the spiked wheel 8 and the arrangement shown in FIG. 1 and generally indicated by the reference A.

After the gaps between the spaced apart plugs have been filled with the powdered or granular filter material one edge of the wrapper is pasted by the paster 24 and the rod then passes through the heater 25 to the cut-off 26. The cut-off 26 has a drive 27 downstream of which is situated the catcher drum 28. The arrangement has only been shown diagrammatically and a more detailed description of similar machines can be found in United States Pats. Nos. 3,118,454, 3,131,612 and 3,143,202.

What I claim as my invention and desire to secure by Letters Patent is:

1. A method of manufacturing filters which includes feeding loose material into spaces between stubs spaced apart within a trough-shaped wrapper, and drawing air through the exposed upper sides of the stubs in order to apply suction through the ends of the stubs to assist the movement of loose material into the spaces between them.

2. A method as claimed in claim 1 in which the stubs are perforated prior to the stubs drawing air through their exposed sides.

3. A method as claimed in claim 2 in which a stub to be perforated is compressed during the perforating operation so that cleaner perforations are thereby obtained.

4. A method of manufacturing filters for cigarettes and the like which includes feeding loose material into spaces between stubs spaced apart within a trough-shaped wrapper and drawing air through the exposed upper sides of the stubs to act on the wrapper to adapt its cross-sectional shape to conform more closely with the stubs.

5. A method as claimed in claim 1 in which the stubs are selected to be of larger cross-sectional area than they are required to be in their final form and the stubs are compressed prior to their total enclosure by the wrapper.

6. A method as claimed in claim 1 in which prior to the deposition of the loose filter material into the spaces between adjacent stubs the stubs are deformed in order to increase the effective cross-section area into which the loose filter material is deposited.

7. A method as claimed in claim 1 in which the said air is heated air.

8. Apparatus for manufacturing a continuous filter rod includes means to feed loose filter material towards spaces between endwise-spaced filter stubs in a trough-shaped wrapper and suction means to engage upper sides of stubs to apply suction through the exposed sides of some at least of the stubs so as to apply suction through the ends of the stubs to promote the inflow of the loose filter material into the said spaces.

9. Apparatus as claimed in claim 8 in which means to perforate the stubs is situated upstream of the aforesaid suction means.

10. Apparatus as claimed in claim 9 in which the perforation means comprises a rotatable wheel having a plurality of spikes extending radially outwardly from its periphery.

11. Apparatus as claimed in claim 10 in which the spiked wheel operates on the stubs through an aperture in a tongue which extends in the direction of travel of stubs and serves to compress the stubs as they approach and pass in contact with the spikes on the said wheel.

12. Apparatus as claimed in claim 8 in which the said suction means to apply suction comprises an apertured screen which is adapted to move in unison with the stubs as the latter travel through the apparatus, apertures in the screen being in register with the gaps between the stubs and the said means to feed the loose filtering material being arranged to deposit the loose filter material through the said apertures into the gaps.

13. Apparatus as claimed in claim 12 in which the apertured screen comprises an endless member which is adapted to move past a stationary suction chamber so that each aperture in turn is brought into communication with the suction chamber.

14. Apparatus as claimed in claim 8 in which the suction means includes a suction element arranged to move above and in contact with the stubs and having ducts to communicate on the one hand with the stub peripheries and on the other hand with a suction chamber.

15. Apparatus as claimed in claim 14 in which the suction element comprises an endless member within which the said ducts are formed and with apertures between the ducts through the loose material can be fed down into the spaces between the stubs.

16. Apparatus as claimed in claim 15 in which the endless member is movable past a stationary suction chamber with which each duct in turn can register.

17. Apparatus as claimed in claim 8 including means to draw air through the stubs to act on the wrapper to adapt its cross-sectional shape to conform more closely with the stubs.

18. Apparatus as claimed in calim 8 including means to draw air through the wrapper which carries the stubs in order to promote the flow of loose filter material into the gaps between the stubs.

References Cited

UNITED STATES PATENTS

| | | | |
|---|---|---|---|
| 3,312,151 | 4/1967 | Molins | 93—1 |
| 3,482,488 | 12/1969 | Sexstone | 93—1 |

TRAVIS S. McGEHEE, Primary Examiner